United States Patent [19]

McDiarmid et al.

[11] 4,317,283
[45] Mar. 2, 1982

[54] STRIPPER TOOL

[75] Inventors: Harry P. McDiarmid, Central Islip; Peter J. Mihelich, Farmingdale, both of N.Y.

[73] Assignee: Grumman Aerospace Corporation, Bethpage, N.Y.

[21] Appl. No.: 182,112

[22] Filed: Aug. 28, 1980

[51] Int. Cl.³ .......................... H02G 1/12; B26F 3/00
[52] U.S. Cl. .................................. 30/164.9; 81/9.5 R
[58] Field of Search ................ 81/9.5 R; 225/2, 6; 30/164.9, 278

[56] References Cited

U.S. PATENT DOCUMENTS

| | | | |
|---|---|---|---|
| 2,508,696 | 5/1950 | Thompson | 30/164.9 X |
| 2,515,020 | 7/1950 | Scott | 30/164.9 |
| 2,566,434 | 9/1951 | Toth | 30/164.9 X |
| 3,133,350 | 5/1964 | Benson | 30/164.9 |
| 3,330,036 | 7/1967 | Mahoney | 81/9.5 R |
| 3,336,666 | 8/1967 | Calkin | 81/9.5 R |
| 3,864,828 | 2/1975 | Bilbrey | 30/164.9 |
| 4,094,212 | 6/1978 | Bradley | 81/9.5 R |
| 4,130,031 | 12/1978 | Wiener | 81/9.5 R |
| 4,242,929 | 1/1981 | Bobby | 81/9.5 R |

Primary Examiner—Jimmy C. Peters
Attorney, Agent, or Firm—Richard G. Geib; Mellor A. Gill

[57] ABSTRACT

A tool that will accept an insulated conductor and spring bias same against an edge of a scribing tool such that the conductor will not be damaged so that known characteristics thereof remain unchanged in scribing insulation for its removal from the conductor.

12 Claims, 3 Drawing Figures

U.S. Patent
Mar. 2, 1982
4,317,283
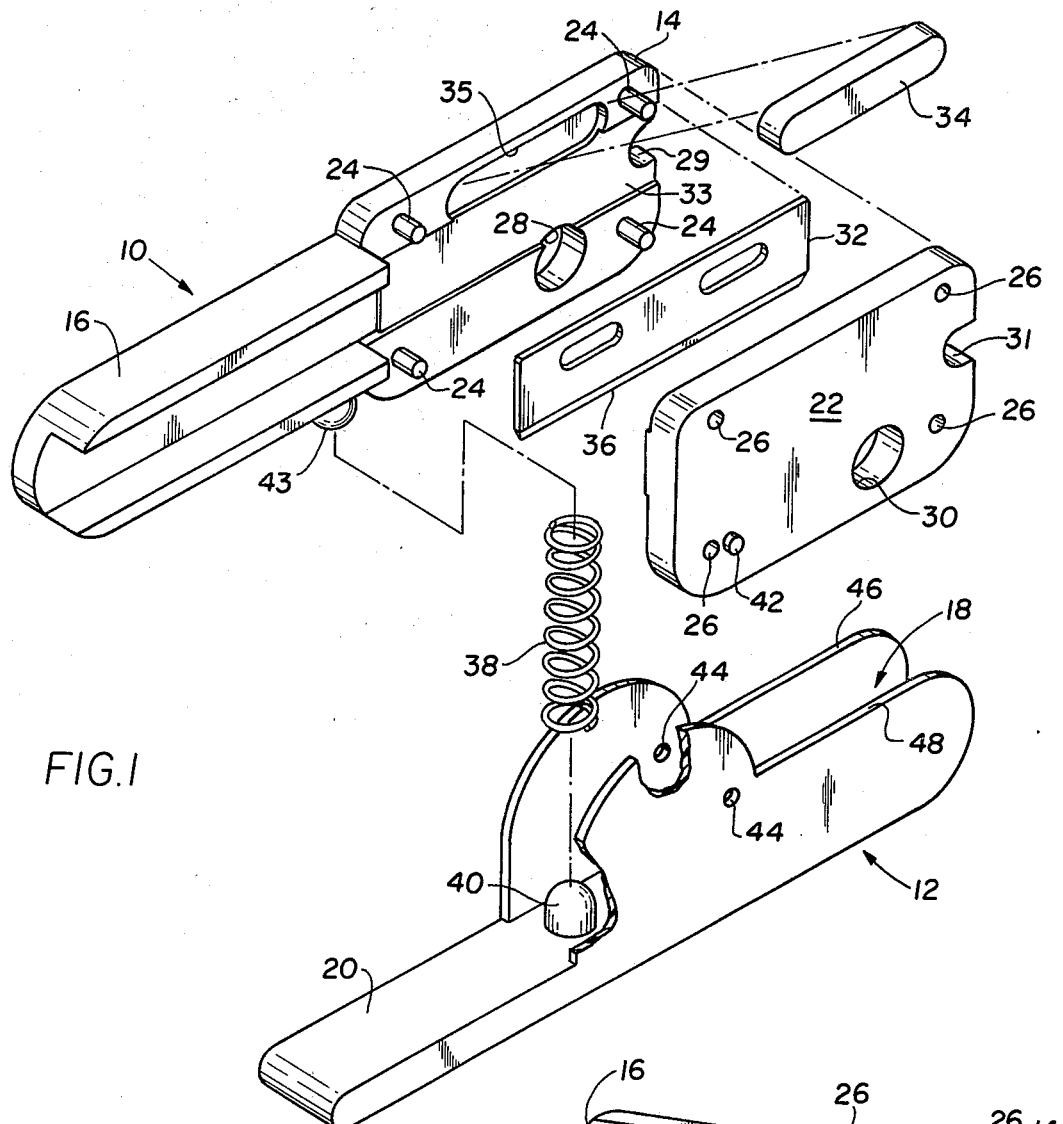
FIG.1
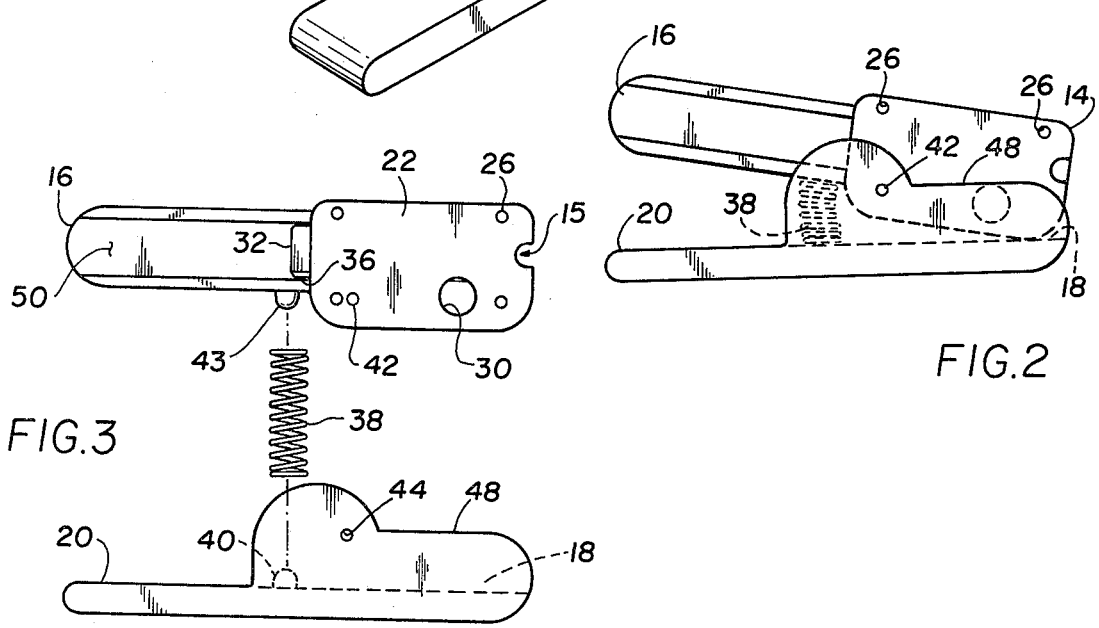
FIG.2
FIG.3

STRIPPER TOOL

BACKGROUND OF INVENTION

In order to utilize insulated conductors, the insulate has to be removed adjacent connection points thereof. Heretofore tools have been devised to cut such insulate without cutting the conductor so that the insulation may be thereafter removed from the conductor. Such tools work with pliable insulation, i.e. plastic, rubber, etc. Examples of prior art devices for such were uncovered during the course of a novelty search as U.S. Pat. Nos. 2,089,774; 2,659,140; 3,169,315; 3,204,495; 3,336,666; 3,665,603; 3,710,654; 3,735,649; 3,893,199 and 3,914,864.

However, the possibility exists with the use of such prior art tools to damage the conductor which then changes the electrical characteristics in regard to critical uses thereof and other means need be devised to prevent such from happening.

Another tool was noted in the prior art that is used to scribe a semi-conductor layer enclosing a cable (see U.S. Pat. No. 3,864,828). In that patent, a hand tool is shown to comprise arms pivotally joined at one end with a spring between them to force them apart. At the other ends, one arm is adapted to receive a multi-layered cable, and the other arm mounts a blade that can be variably projected to scribe the hard (semiconductor) outer layer by rotating it (the tool) around such cable.

None of these tools address the need for a fool-proof tool to scribe the surface of today's Kapton insulated wires such that after scribing the Kapton may be, as with the scribing of glass, broken away from the conductor without damage to the conductor's electrical characteristics. It is in this void that the invention of these Letters Patent finds particular utility.

SUMMARY OF THE INVENTION

It is the principle object of this invention to provide a tool that will permit removal of thin wall, hard insulation from a conductor.

It is a more detailed object to provide such a tool that will only scribe such insulation and not cut, score, compress or otherwise affect the conductor.

BRIEF DESCRIPTION OF THE DRAWINGS

FIG. 1 is an isometric exploded view of the elements of this invention;

FIG. 2 is a side view of the assembly of the elements according to this invention; and FIG. 3 is a side, exploded view of the principal parts assembled from various elements according to this invention.

DETAILED DESCRIPTION OF THE DRAWINGS

With particular reference to FIG. 1, there is shown all the various elements comprised in this disclosure, i.e. a first member 10 and second member 12 including a housing or body 14, undercut as at 15, and an arm 16 and a channel 18 and arm 20, respectively. A cover 22 is adapted to be assembled to the housing by means of snap fitting projections 24 of housing 14 within holes 26 of cover 22 to register openings 28 and 30. Prior to such assembly, however, a scribe (blade) 32 is slid into cavity 33 of housing 14 from notch end 15 under a pressure pad 34 in cavity 35 that is formed in both the body (housing) 14 and cover 22. When so assembled, the cutting edge 36 of the blade 32 is extended very slightly into the upper surface, as shown, of the openings 28, 30, i.e. approximately tangential with the upper surface but limiting the diameter somewhat of the opening.

Removal and replacement of dull blade 32 is accomplished by pushing the old blade through the area exposed by notches 29 and 31, inserting a new blade into cavity 33 in front of the old blade and pushing the new blade into position, causing at the same time the old blade to exit into the recess in arm 16 from which it may be removed for disposal.

Next a spring 38 is fitted over a projection 40, sized to frictionally hold the spring and the second member 12 is assembled to the first member 10 by snap fitting the projections 42, one of which is shown from cover 22 and another of which (not shown) is from housing 14 on line with the projection from the cover, into holes 44 after the spring carried by projection 40 is localized by a projection 43 (see FIG. 3) under arm 16 in alignment with projection 40 when the members 10 and 12 are assembled. The assembly compresses the spring 38 to bias the housing 14 into the channel 18 to assume the normal attitude shown by FIG. 2.

To scribe an insulate of a conductor, levers (arms) 16 and 20 are pressed together to expose openings 28 and 30, the insulated conductor is inserted through openings 28 and 30 to a desired length. Thereafter, after the proper scribe location is reached on the Kapton wall, the levers 16 and 20 are released whereby the surfaces 46 and 48 of the channel 18 will bias the Kapton wall against the cutting edge 36 of scribe means 32 across the openings 28, 30.

With the thin wall Kapton insulation being used today, that is all that is needed, to score the outer surface, and the insulated conductor may be removed from the openings 28, 30 and bent at the scribed area. This act of bending will, as with a scribed glass plate, break the Kapton wall around the conductor at that location to expose the conductor.

The blade 32 may be replaced by pushing it into the arm cavity 50 by a dull implement or coin until it is clear of the half-moon slot (notch 15) and the insertion of new blade 32 into vacated track so that it is guided in insertion into body 14 while forcing old blade 32 into cavity 50.

In that the tool uses the spring to effect the scribing and not the operator, the conductor will not be cut, scored, compressed. Thus, the operator will not change the electrical characteristics of the conductor with use of this tool.

We claim:

1. A tool for scribing a surface, said tool comprising:
   first and second pivotally connected members, said first member having an arm and a body with an opening with a scribing means across one edge of said opening extending thereinto a limited distance only, said second member having an arm and a channel; and
   spring means between said arm of said first member and said arm of said second member to bias same apart from each other to cause said channel of said second member to close over the body of said first member and cover said opening.

2. The tool of claim 1 and further characterized in that said body includes a housing and a cover adapted to be snap fitted together with an opening through each in registry on assembly.

3. The tool of claim 2 wherein the housing is provided with a cavity open at both ends and along said one edge of the opening.

4. The tool of claim 3 wherein the scribing means is inserted in said cavity to have a cutting edge of said scribing means along the said one edge of said opening.

5. The tool of claim 4 wherein the housing and the cavity mount a means to bias said scribing means so that said cutting edge is maintained in the attitude of limited projection into said opening along said one edge thereof.

6. A tool according to claim 1 wherein said arm of said first member and said arm of said second member include facing projections that mount said spring means therebetween.

7. The tool of claim 6 wherein said first member and said second member are joined by snap fitting projections of one of said first member or second member into holes of one of said second member or first member to form a pivot point on one side of and adjacent to said spring means to bias said channel of said second member to envelope said body of said first member.

8. The tool of claim 1 wherein said first member and said second member are joined by snap fitting projections of one of said first member or second member into holes of one of said second member or first member to form a pivot point on one side of and adjacent to said spring means to bias said channel of said second member to envelope said body of said first member.

9. The tool of claim 5 wherein said first member and said second member are joined by snap fitting projections of one of said first member or second member into holes of one of said second member or first member to form a pivot point on one side of and adjacent to said spring means to bias said channel of said second member to envelope said body of said first member.

10. A tool for scoring a thin wall insulate about a conductor to permit same to be removed, said tool comprising:
a housing, said housing including an opening, a first cavity, a second cavity and an arm extending therefrom;
a cover for said housing, said cover having an opening and a cavity, said opening and cavity of said cover being located for registry with the opening and first cavity of said housing when said cover is assembled thereto to provide a passageway through said housing and said cover;
a pressure pad in said first cavity in said housing;
a blade in said second cavity of said housing under said pressure pad, said blade being forced to expose a limited cutting edge in said opening by said pressure pad;
a lever pivotally connected to said housing and said cover, said lever having a channel within which said housing may fit so that the sides of said channel will cover said opening of said housing and said opening of said cover, and
spring means between said arm and said lever to bias same apart from each other and locate said housing in said channel whereby said arm and said lever must be moved towards each other to expose the passageway.

11. The tool of claim 10 wherein:
a first notch is provided at said open end of said cavity which is opposite said arm of said first member; and
a second notch is provided on said cover, said second notch being located for registry with said first notch;
whereby replacement of said scribing means may be facilitated by pushing said scribing means through the area exposed by said notches.

12. The tool of claim 9 wherein:
a first notch is provided at said open end of said cavity which is opposite said arm of said first member; and
a second notch is provided on said cover, said second notch being located for registry with said first notch;
whereby replacement of said scribing means may be facilitated by pushing said scribing means through the area exposed by said notches.

* * * * *